Aug. 23, 1966     H. V. HENDERSON     3,267,876
DRIVES FOR OVERHEAD HAULAGE VEHICLES
Filed July 6, 1965     2 Sheets-Sheet 1

*INVENTOR.*
HERBERT V. HENDERSON
BY

Shoemaker and Mattare.
Attorneys

United States Patent Office 3,267,876
Patented August 23, 1966

3,267,876
DRIVES FOR OVERHEAD HAULAGE VEHICLES
Herbert V. Henderson, Germiston, Transvaal, Republic of South Africa, assignor to Anglo-Transvaal Consolidated Investment Company Limited, Johannesburg, Transvaal, Republic of South Africa
Filed July 6, 1965, Ser. No. 469,541
Claims priority, application Republic of South Africa, July 10, 1964, 64/3,269
4 Claims. (Cl. 105—73)

This invention relates to drives for overhead haulage vehicles and more particularly to locomotives coupled to propel one or more carriages or tubs with the train suspended from an overhead track.

It will be appreciated that it is desirable to drive locomotives such as those above referred to with sufficient adhesion between the driving wheels and rails to propel the load at a given time and under the particular existing circumstances without slippage between drive wheels and rails while at the same time not applying unnecessarily large pressures to the drive wheels.

The object of the present invention is to provide a drive arrangement for such vehicles wherein the pressure applied by the drive wheels to the rails will vary automatically with the load to be moved.

According to this invention there is provided a locomotive adapted to be suspended from an overhead track said locomotive comprising a rigid frame having track engaging wheels to be positioned on opposite sides of a supporting track, a movable wheel support for at least one of said wheels mounted to allow limited movement of said support with respect to the frame in a direction substantially vertical to the length of the frame and radial to such wheel, a draw bar longitudinally movable relative to the frame and a pair of rigid links pivotally connected at one end to the movable wheel support and having the other ends thereof splayed apart one on each side of the movable wheel support, a longitudinal guide in the draw bar constraining the splayed ends of the links and a drive for at least one of the wheels.

Further features of the invention provide for the running wheels to be symmetrically disposed on each side of a central movable drive wheel and for the running wheels to contact the upper surface of the track with the drive wheel located below the track.

A preferred embodiment of this invention will be described with reference to the accompanying drawings in which.

Figure 1:
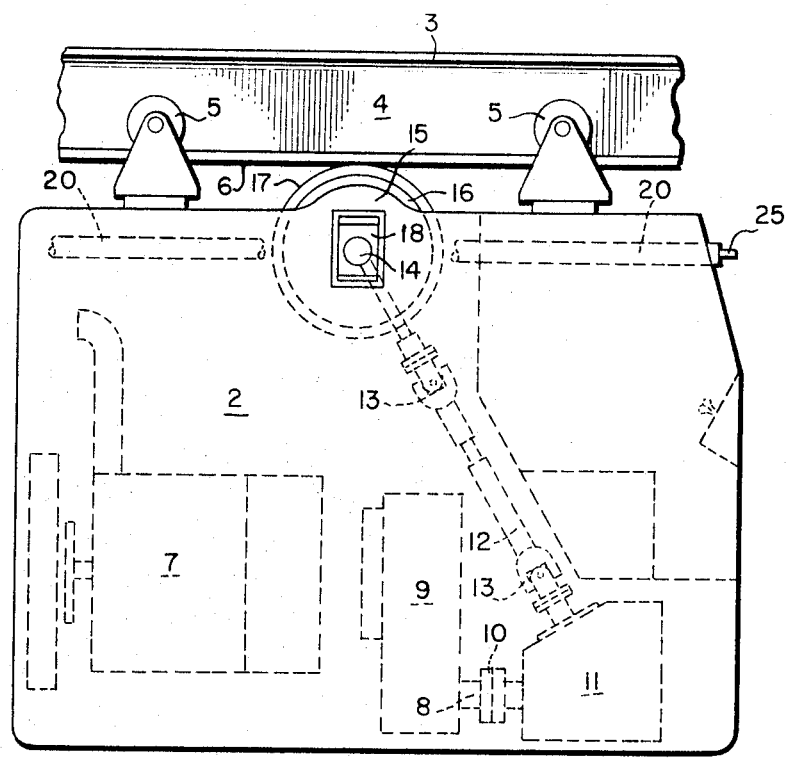
FIG. 1 is a general diagrammatic view of a locomotive.

It will be appreciated that the monorail locomotive illustrated in FIG. 1 is only one form of locomotive suitable for use with the present invention. Other constructions may be used to provided either the drive or running wheels and the draw-bar are supported by but movable relative to the locomotive frame in the manner set forth above.

Briefly then with regard to FIG. 1 a practical form of locomotive 1 comprises a rigid frame 2 suspended from a track 3 which may conveniently be in the form of an I beam 4. The frame 2 is supported from two pairs of running wheels 5 which wheels are rotatably mounted on axles located towards the ends of the frame which axles will preferably be secured to the frame 2 in any convenient manner in swivel mountings which ensures that no longitudinal or vertical displacement of these wheels 5 relative to the frame 2 can take place.

As shown the wheels 5 run on the upper surfaces of the lower flanges 6 of I beam 4.

The frame 2 also houses the prime mover for the locomotive which may be a diesel engine 7 illustrated by the dotted lines representation and the drive 8 from this engine is connected either directly or through a torque convertor 9 by a coupling 10 to a suitable reduction gearing unit 11. The output from the unit 11 is connected by means of an extensible drive shaft 12 and universal joints 13 to the axle shaft 14 of a single drive wheel assembly 15.

The assembly 15 is mounted in the frame 2 so that drive wheel 16 engages the undersurface of flanges 6 of I beam 4. The wheel 16 is preferably provided with a resilient tyre 17 made of material which will promote frictional engagement between wheel 16 and flange 6.

The drive wheel 16 is located in a central position relative to the running wheels 5 and the axle shaft 14 therefor is supported in bearing blocks 18.

The locomotive frame 2 also embodies in operator's cab with the necessary controls for operation of the locomotive.

Spring means (not illustrated) may be incorporated in the assembly to ensure that a certain minimum pressure is applied to the wheel supports to ensure engagement between tyre 17 and the track surface.

The lowest position of the drive wheel 16 is made to afford sufficient adhesion to drive at least the locomotive on its own without any load such as a train of carriages or tubs.

Figure 2:
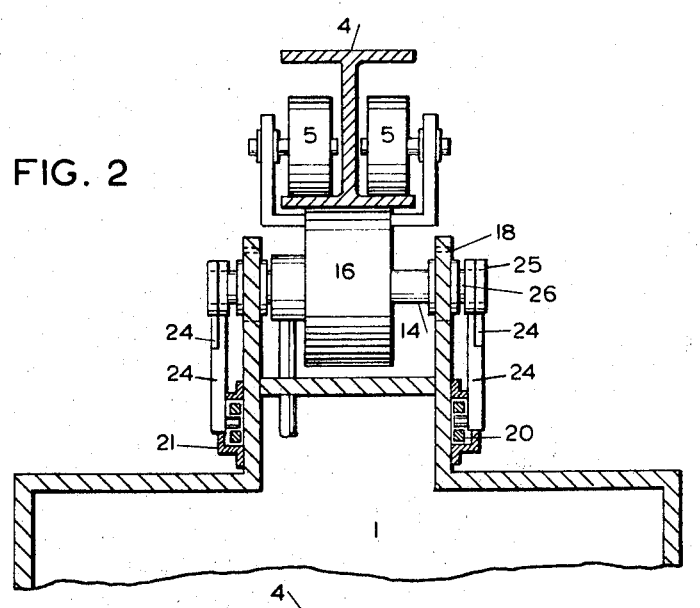
FIGS. 2 and 3 are diagrammatic representations illustrating the operation of this invention.
Figure 3:
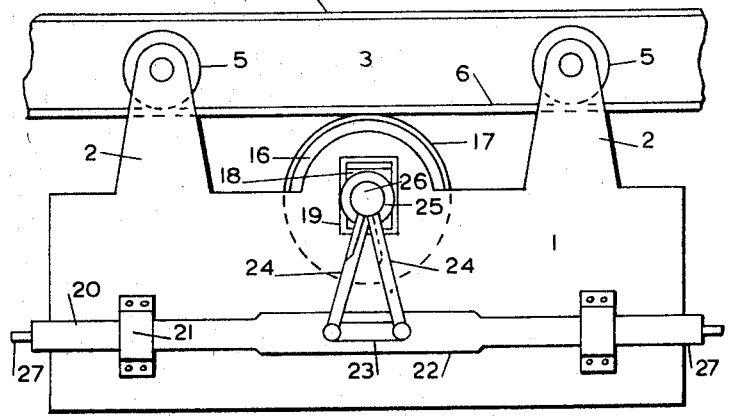

Referring now more particularly to diagrammatic drawings of FIGS. 2 and 3 it will be seen that the bearing blocks are located in robust guides 19 in a manner which allows a limited movement of the wheel 16 vertical to the surface of the track 3 engaged by wheel 16.

A draw-bar 20 for coupling a load in the form of a train of carriages or tubs is mounted on the frame 2 of the locomotive in suitable guides 21 in such a manner that it may move a limited amount in both directions longitudinally of the frame 2 and parallel to its length.

The central portion 22 of the draw-bar 20 has a longitudinal slot 23 forming a guide to constrain the movement of the one end of each of a pair of rigid links 24. When no load is applied to the draw-bar 20 one end of each link 24 will engage one end of the slot 23.

The upper ends 25 of the links 24 are both pivotally connected independently to a support 26 for the drive wheel 16 and from the above description it will be appreciated that when the draw-bar has no load connected thereto the guide portion 23 therein will be symmetrically positioned below the drive wheel support 26 with the two links 24 splayed outwardly and downwardly.

As soon as any load is applied to the draw-bar 20 and the locomotive 1 driven in either direction there will be a relative longitudinal movement between the draw-bar 20 and the locomotive frame 2. This will force one or other of the links 24 towards a vertical position consequently causing similar movement of the other link and pressing the drive wheel 16 into tighter engagement with the track 3.

Braking effort or reversal of the direction of movement of the locomotive will reverse the relative movement between locomotive 1 and draw-bar 20 to bring the other link 24 into operation to provide the necessary adhesion between track 3 and drive wheel 16 and the ratio of the force due to the load is in relation to the angle between the links 24 and draw-bar 20.

It will be noted that the draw-bar assembly is bifurcated along its central portion so that links 24 and guides therefor are provided for wheel supports 26 on each side of the plane of rotation of drive wheel 16. Single end portions 27 are thereby provided on the ends of drawbar 20 to which the load may be connected.

Relatively moving parts of the assembly in contact with each other will be made as free from friction as possible.

The position of drive linkage and running wheels relative to the track may be reversed if desired and more wheels and linkages may be provided without departing from the scope of this invention.

What I claim as new and desire to secure by Letters Patent is:

1. A locomotive adapted to be suspended from an overhead track, said locomotive comprising a rigid frame having track engaging wheels relatively positioned for engaging against opposite sides of the support track, bearing blocks carried by and spaced apart transversely of said frame, means supporting said blocks on the frame to have up and down movement relative thereto, one of said track engaging wheels being a drive wheel which is operatively connected with said bearing blocks for rotation, an elongate draw bar extending longitudinally along one side of said frame, means on the frame supporting said draw bar for reciprocal movement, the draw bar being substantially perpendicular to the rotational axis of said wheel and being below said axis, said operative connection of the drive wheel with the bearing blocks including support means for the drive wheel, a pair of relatively long rigid links extending in divergent relation downwardly toward said draw bar from and pivotally connected at their upper ends to one of said support means to swing in a vertical plane substantially paralleling the draw bar, means coupling the lower ends of said links with said draw bar for imparting an upward thrust to one link upon longitudinal movement of the draw bar in one direction, and a drive means for said drive wheel.

2. The invention according to claim 1, wherein the said means coupling the lower ends of the links with the draw bar embodies a relatively short guide means carried by and extending longitudinally of the draw bar, and a means carried by each link having sliding engagement in said guide means and having an at rest position at one end of the guide means when the draw bar is free of longitudinal pull.

3. The invention according to claim 1, wherein the said means coupling the lower ends of the links with the draw bar embodies a substantially straight, short slot in the draw bar intersected by the lower ends of the links, and elements carried by said lower ends of the links and loosely slidably engaged in said slots and each element having an at rest position in one end of the slot when the draw bar is free of longitudinal pull.

4. A locomotive adapted to be suspended from an overhead track, said locomotive comprising a rigid frame having opposite longitudinal sides and having track engaging wheels relatively positioned for engagement against opposite sides of the supporting track, bearing blocks carried by said opposite sides of the frame and mounted thereon to have up and down movement relative thereto, one of said track engaging wheels being a drive wheel and operatively connected with said bearing blocks for rotation, an elongate draw bar extending longitudinally along each of said opposite sides of said frame, means on the frame supporting said draw bars for reciprocal movement, the draw bars being substantially perpendicular to the rotational axis of said wheel and being below and spaced from said axis, said operative connection of the drive wheel with the bearing blocks including support means for the drive wheel at each side of the frame, a pair of relatively long rigid links extending in divergent relation downwardly toward each draw bar from and pivotally connected at their upper ends with the adjacent support means to swing in a vertical plane substantially paralleling the draw bar adjacent thereto, the two draw bars along the sides of the frame forming a bifurcated assembly having single end portions to which a draft load may be connected, means coupling the lower ends of each pair of links with the draw bar adjacent thereto for imparting an upward thrust to one link of each pair upon longitudinal movement of the draw bar assembly in one direction, and a drive means for said drive wheel.

References Cited by the Examiner

UNITED STATES PATENTS

| 573,772 | 12/1896 | Feldmann | 105—30 |
| 2,608,163 | 8/1952 | Martin | 105—153 |

FOREIGN PATENTS

| 550,771 | 5/1932 | Germany. |
| 959,178 | 5/1964 | Great Britain. |

ARTHUR L. LA POINT, *Primary Examiner.*

B. FAUST, D. HOFFMAN, *Assistant Examiners.*